May 8, 1962    G. W. GROSCH    3,033,514
IRRIGATION GATE VALVE
Filed March 9, 1959
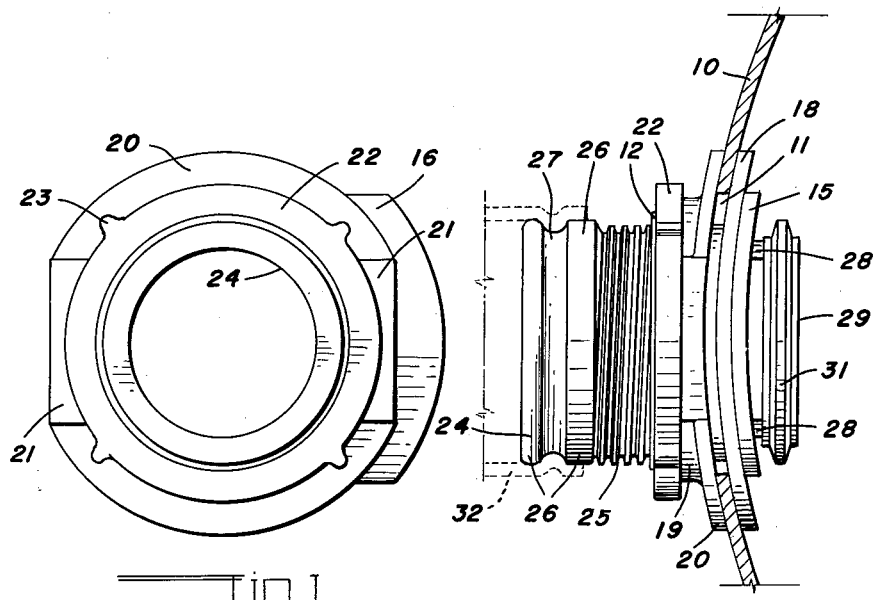
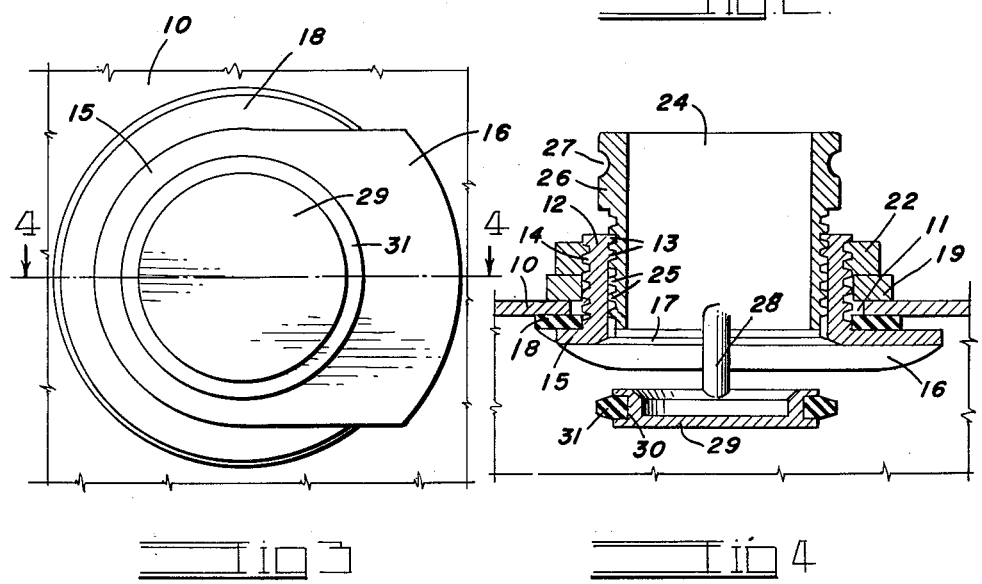
INVENTOR.
GOTTLIEB W. GROSCH
BY
ATTORNEY

United States Patent Office 3,033,514
Patented May 8, 1962

3,033,514
IRRIGATION GATE VALVE
Gottlieb W. Grosch, Silver Creek, Nebr.
Filed Mar. 9, 1959, Ser. No. 797,998
1 Claim. (Cl. 251—145)

This invention relates to a side outlet valve for above ground irrigation pipes and has for its principal object the provision of an economical and highly-efficient valve: which can be quickly and easily installed in any desired position along an above-ground irrigation pipe; which will securely retain itself in position on the pipe without leakage; and which can be accurately preset to deliver any desired flow of water from the pipe.

Another object of the invention is to so construct the improved valve that its efficient operation will not be interfered with by mud, sand, and sediment and to provide a valve to which a hose or plastic siphon tube can be readily attached for delivery of the discharging water to any desired location.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

FIG. 1 is a front face view of the improved irrigation valve;

FIG. 2 is a side view thereof illustrating the valve in place in an above-ground irrigation pipe;

FIG. 3 is an inside face view of the valve as it would appear in place in the pipe; and FIG. 4 is a horizontal section taken on the line 4—4, FIG. 3.

A conventional above ground irrigation pipe is indicated at 10. This invention is designed to be installed in the wall of the pipe 10 through a round opening 11.

The improved side outlet valve comprises an annular body 12 having inlet and outlet extremities. One or two turns of internal threads 13 are formed on the outlet extremity and the body is provided with external threads 14 throughout its length. The inlet extremity of the body 12 is formed with an enlarged flange of irregular shape. The flange consists of a semi-circular portion 15, which surrounds one-half of the inlet extremity of the body portion and projects but slightly therefrom, and an enlarged apron portion 16 which extends tangentially from the semi-circular portion 15 and projects to one side of the body 12 a distance substantially equal to the radius of the axial opening in the body portion. Both portions 15 and 16 of the flange are semi-cylindrically curvated to substantially correspond to the inner diameter of the pipe 10. The width of the apron portion 16 is slightly less than the diameter of the opening 11 in the pipe 10.

An annular, circular, internal sealing gasket 18 is positioned about the body 12 and against the flange 15—16 and, when the valve is in place in the pipe, the sealing gasket bears against and seals the flange to the internal surface of the pipe. The body portion is held in place in the opening 11 in the pipe by means of saddle washer 19. The saddle washer 19 is provided with a base flange 20 of a diameter substantially corresponding to the diameter of the internal sealing gasket 18. The base flange 20 is curvated about a transverse axis on a radius substantially equal to the external radius of the pipe 10. Two, rectangular, oppositely-positioned tool lugs 21 project outwardly from opposite sides of the flange 20.

The saddle washer has a concentric opening, of sufficient diameter to allow it to be slipped over the external threads 14 of the body 12 and the base flange 20 is clamped against the external surface of the pipe 10 by means of an annular clamping nut 22 having internal threads which are threaded onto the external threads 14 of the body. The nut 22 is preferably provided with projections 23 which provide efficient finger grips to allow the nut to be tightened into position by hand.

A hollow cylindrical valve core 24 having an inlet and an outlet extremity is positioned within the body 12. The valve core 24 is provided with external threads 25 which can be threaded into the internal threads 13 of the body 12. The valve core 24 is formed with an enlarged, external head 26 which provides a convenient finger grip for rotating the valve core. The enlarged head 26 is provided with a peripheral groove 27 which serves as a retainer for a flexible hose or siphon tube which can be slipped over the extremity or head 26, as indicated in broken line at 32.

The valve core 24 is preferably a precast die-casting and is cast with two oppositely positioned spacing legs 28 which maintain an integrally cast valve disc 29 in concentric, axially-spaced relation to the inlet extremity of the core 24. The diameter of the valve disc 29 is slightly less than the internal diameter of the internal threads 13 of the body so that the entire core may be threaded through the body. A tapered valve seat 17 is formed in the flange about the inlet extremity of the body portion. The valve disc 29 is provided with peripheral groove 30 into which an elastic valve washer 31 is inset so that when the core 24 is threaded outwardly, the valve washer 31 will seat against the valve seat 17 to completely seal the valve and prevent further outward movement of the valve core 24. The valve is furnished to the user with the valve core 24 in place therein and with the valve washer 31 in place in the groove 30. The core cannot be displaced from the housings since inward movement thereof is resisted by the enlarged head 26 and outward movement thereof is prevented by the valve washer 31.

The valve is inserted in the opening 11 in the pipe 10 by inserting the apron portion 16 of the flange through the opening 11, thence moving the body 12 longitudinally of the pipe to allow the semi-circular portion 15 of the flange to pass through the opening. One edge of the flexible washer 18 may be bent or folded upwardly to permit the insertion of the washer 18 in the opening 11. The body is then moved axially and is centered in the opening 11 to cause the semi-circular portion 15 of the flange to overlie the edge of the opening 11, as shown in FIG. 4, and the saddle washer 19 and the nut 22 are then clamped into position to cause the flange 15—16 to compress the internal sealing gasket 18 against the internal surface of the pipe 10. The external threads 25 on the core 24 are preferably left-handed threads, since it is normal for a person to rotate a valve in a clockwise direction to close it. With left-hand threads clockwise rotation of the core 24 will cause the valve disc 29 to move outwardly so that the valve washer 31 will approach its seat 17.

It can be seen then when in the open position in FIGS. 2 and 4, water can flow freely into the core 24 completely around the valve disc 29 and when the core is rotated clockwise, the washer 31 will seat against the seat 17 to prevent flow through the core 24.

The lugs 21 provide convenient gripping means for moving and rotating the body into position.

While a specific form of the improvement has been described and illustrated herein, it is to be understood that the same may be varied within the scope of the appended claim, without departing from the spirit of the invention.

Having thus described the invention what is claimed and desired secured by Letters Patent is:

A side outlet valve for insertion in a circular opening in an above-ground irrigation pipe comprising: a cylindrical body having inlet and outlet extremities; a valve seat surrounding the inlet extremity of said body; an outwardly projecting flange surrounding said valve seat; a sealing gasket having an outside diameter greater than the diameter of the opening in said pipe positioned about said body and against said flange; internal threads formed in said body; a saddle washer fitted over and surrounding said body and adapted to contact the external surface of said pipe; a locking nut threaded on external threads formed on said body so that when rotated it will clamp said saddle washer against said pipe, a portion of said outwardly projecting flange being formed by a semi-circular portion of a radius slightly less than the radius of the opening in said pipe, and the remainder of said flange being formed by an apron portion having sides substantially tangential to the ends of said semi-circular portion, the outer extremity of said apron portion being curved on an arc having a radius in excess of the opening in the pipe.

References Cited in the file of this patent

UNITED STATES PATENTS

| | | |
|---|---|---|
| 1,345,032 | Smith | June 29, 1920 |
| 1,485,579 | Wyatt | Mar. 4, 1924 |
| 1,542,645 | Saucke | June 16, 1925 |
| 1,848,632 | Jensen | Mar. 8, 1932 |
| 2,439,539 | Cellwork | Apr. 13, 1948 |
| 2,697,582 | Grosch | Dec. 21, 1954 |
| 2,764,385 | Sieling | Sept. 25, 1956 |
| 2,800,912 | McCamish | July 30, 1957 |
| 2,830,260 | Chiocca | Apr. 8, 1958 |

FOREIGN PATENTS

| | | |
|---|---|---|
| 101,689 | Great Britain | Oct. 12, 1916 |
| 493,089 | France | Apr. 7, 1919 |
| 336,735 | Great Britain | Oct. 23, 1930 |